United States Patent [19]

Körting

[11] 4,026,410

[45] May 31, 1977

[54] TRAVELLING GRATE CHAIN

[75] Inventor: Reinhard Körting, Neubeckum, Germany

[73] Assignee: Polysius AG, Neubeckum, Germany

[22] Filed: Oct. 23, 1975

[21] Appl. No.: 624,869

[30] Foreign Application Priority Data

Nov. 19, 1974 Germany .......................... 2454835

[52] U.S. Cl. ................................................ 198/848

[51] Int. Cl.² .......................................... B65G 15/30

[58] Field of Search .......... 198/189, 195, 181, 182, 198/848; 214/21

[56] References Cited

UNITED STATES PATENTS

| | | | |
|---|---|---|---|
| 1,651,981 | 12/1927 | Tevander | 198/189 |
| 3,174,617 | 3/1965 | Noffsinger | 198/195 |
| 3,450,260 | 6/1969 | Mathews et al. | 198/189 X |
| 3,651,924 | 3/1972 | Homeier | 198/182 X |
| 3,881,593 | 5/1975 | Mushovic | 198/189 |
| 3,920,117 | 11/1975 | Roinestad | 198/181 X |

*Primary Examiner*—Evon C. Blunk
*Assistant Examiner*—Douglas D. Watts
*Attorney, Agent, or Firm*—Marshall & Yeasting

[57] ABSTRACT

A plurality of parallel strands comprise chain links which are articulately connected together by grate pins that extend transversely over the entire width of the grate. Rod-like holding members are carried on the chain links and extend substantially parallel to the grate pins. Assemblies of individual support bars have upper edges higher than the chain links, each support bar having two recesses to receive two rod-like holding members. Each assembly of support bars extends substantially between the longitudinal centers of two chain links and is supported by a separate pair of rod-like holding members, for receiving material deposited on the travelling grate chain, and comprises slots for the passage of treatment gas. Each pair of rod-like holding members is interrupted at an intermediate point to provide a gap for insertion and removal of the support bars.

14 Claims, 8 Drawing Figures

TRAVELLING GRATE CHAIN

BACKGROUND OF THE INVENTION

The invention relates to a travelling grate chain comprising chain links articulately connected together by grate pins, and support bodies which are disposed between the chain links, serve to receive the material to be treated and comprise slots for the passage of treatment gas.

Travelling grate chains of the aforementioned type are used primarily in travelling grates in which material to be treated is spread in a layer on the travellng grate chain and conveyed through at least one treatment chamber in which by means of gas the material is for example preheated, fired or cooled; the material to be treated is disposed on the top surface of the upper chain run and discharged from the support surface of the travelling grate chain in the region of a deflection point at which the upper chain is deflected downwardly.

In known embodiments of a travelling grate chain the support bodies are generally formed by a support plate or grate plate in which a plurallity of grate slots are provided, and are generally disposed as integral parts between adjacent chain links, the top surfaces of the support or grate plates lying at the same level as the top surfaces or top edges of the chain links.

As a result of the complicated form of these grate plates serving as support bodies for the material to be treated, in some cases very great temperature differentials occur, giving rise to high thermal stresses within a grate plate, leading inevitably to many fractures and frequent destruction of grate plates. This effect is moreover intensified by the fact that the grate chain and thus also the grate plates are exposed in most cases during their travel to considerably higher temperatures in the region of the upper run than they are in the region of the lower run, where in many cases the grate chains are strongly cooled. These high thermal stresses frequently lead to damage both of the grate plates and of the chain links, and consequently undesirable shutdown times are necessary for the repair of the travelling grate chain. In addition, frequently a web between two adjacent grate slots in a grate plate breaks away, making it necessary to replace the entire grate plate. Since the grate plates serving as support bodies and to some extent also the chain links themselves are complicated parts, made as castings, the production of these parts is relatively expensive.

SUMMARY OF THE INVENTION

The object of the invention is to eliminate the disadvantages of the known constructions and to provide a travelling grate chain of the type initially mentioned which is distinguished by simplification of as least some essential parts and by the fact that at least the thermal stresses acting on the chain links are reduced compared with those in the known constructions.

This object is achieved according to the invention in that support bodies are formed of individual support bars whose upper edge is higher than that of the chain links.

Since in this embodiment according to the invention each support body is made up of individual support bars, the latter may be constructed in a relatively simple manner so that they are less sensitive to thermal stresses. If in this embodiment a support bar breaks it is only necessary to replace it by a new one and there is no need to replace the entire support body between adjacent chain links.

A further essential advantage of the travelling grate chain according to the invention results from the fact that the upper edge of the support bars is higher than the upper edge of the chain links. In this manner, the layer of material to be treated can be supported substantially on the support bars of the support body, and consequently the individual chain links have very little contact, or none at all, with the material and thus cannot be exposed to excessive thermal stresses as is the case in the known constructions. This is of particular advantage in travelling grate chains on which the material to be treated is highly heated. The different vertical location of the upper edges of the support bars and the chain links makes it possible, if desired, to have the chain links located completely beneath the support bars, giving the further advantage of an enlarged gas-permeable grate surface.

It is also pointed out in this connection that the reference to the elevations of the support bar and chain link upper edges applies in each case to the region of the travelling grate chain upper run; before and after the front and rear deflection points and in the region of the lower run of the chain the conditions are necessarily different.

In any case the embodiment of a travelling grate chain according to the invention makes it possible to concentrate the major part of the inevitable wear substantially on the support bars of the support bodies, which are relatively simple and cheap to make; the chain links themselves only need to perform a purely supporting function and consequently, compared with known constructions, they may also be made simpler and cheaper.

A BRIEF DESCRIPTION OF THE DRAWINGS

DESCRIPTION OF THE PREFERRED EMBODIMENTS

Figure 1:
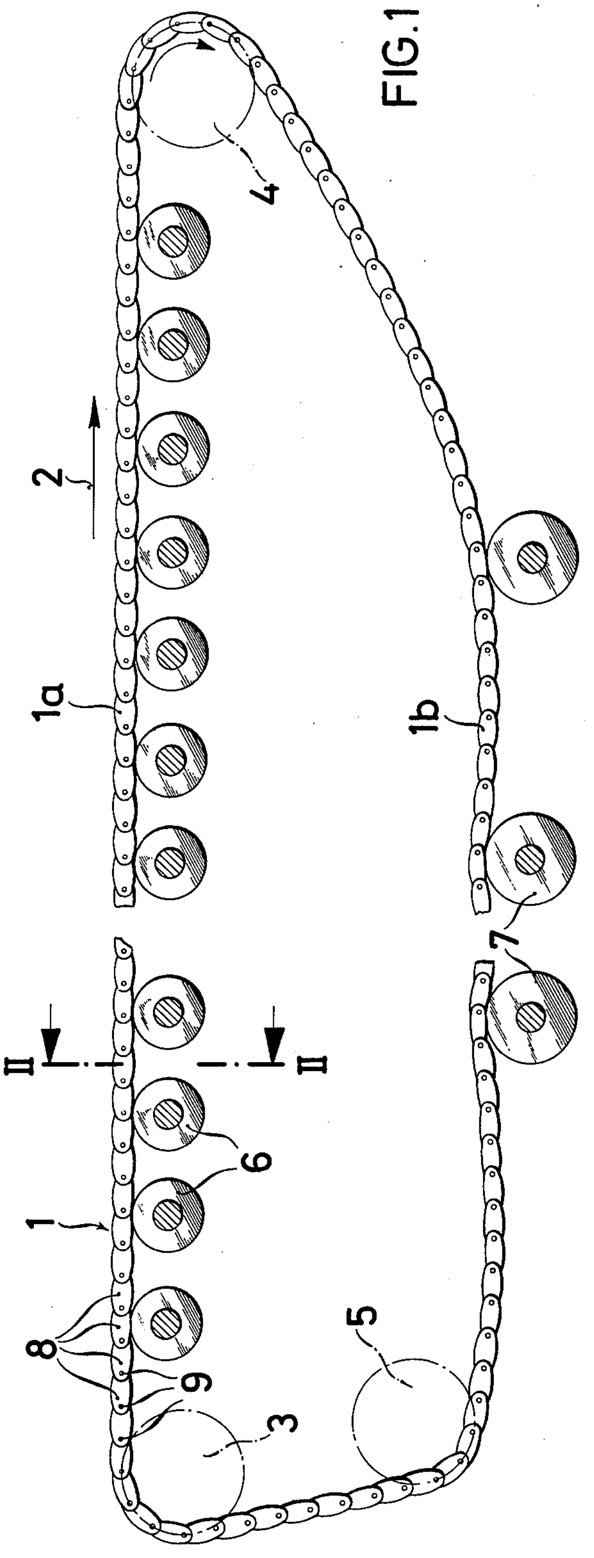
FIG. 1 is a diagrammatic side elevation of a travelling grate chain according to the invention, supported and guided on rollers.

FIG. 1 shows diagrammatically a travelling grate chain 1 which runs continuously in the direction of the arrow 2 and is led and guided at its ends by drive and guide rollers 3, 4, 5. The chain 1 is further supported in the region of its upper run 1*a* by a plurality of support rollers 6 whilst the lower run 1*b* of the chain 1 is carried and supported by a plurality of more widely spaced support rollers 7. The upper run 1*a* of the chain 1 is charged in the region following the guide roller 3 with material which is discharged in the region of the guide roller 4.

The chain 1 is made up of a plurality of links 8, any two links which are adjacent each other longitudinally being connected articulately together by a grate pin 9 extending transversely of the travelling grate chain 1. Depending on its width and capacity, the travelling grate chain is made up of a plurality of parallel chain strands extending in spaced relationship. The links 8 which are adjacent each other transversely of the chain 1 are disposed on the same two grate pins, and a spacer tube 10 serves to maintain the exact spacing, said tube 10 being disposed on the grate pin 9 between two links 8 adjacent each other transversely of the chain (cf. FIG. 2).

Figure 2:
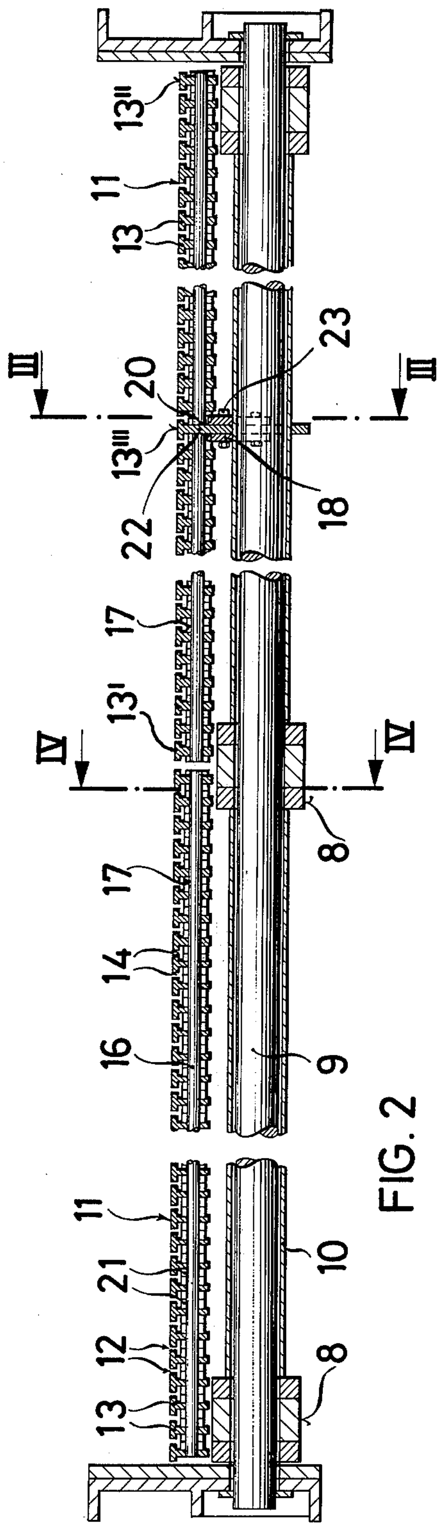
FIG. 2 is an enlarged fragmentary vertical section through the upper run of the travelling grate chain (along the line II—II of FIG. 1)
Figure 3:
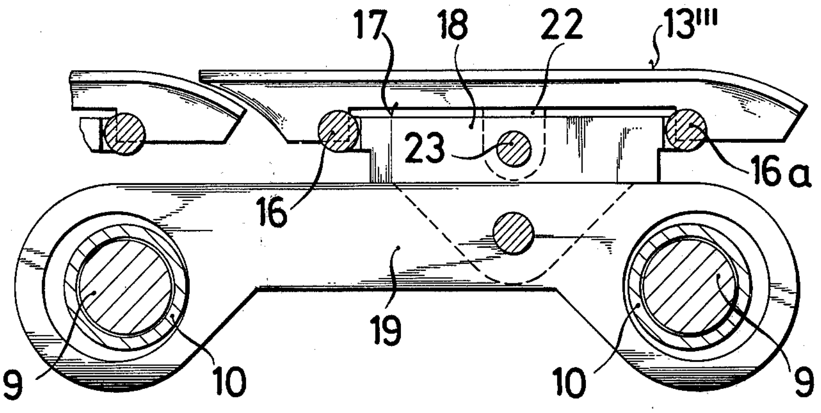
FIG. 3 is a further enlarged fragmentary section along the line III—III of FIG. 2.
Figure 4:
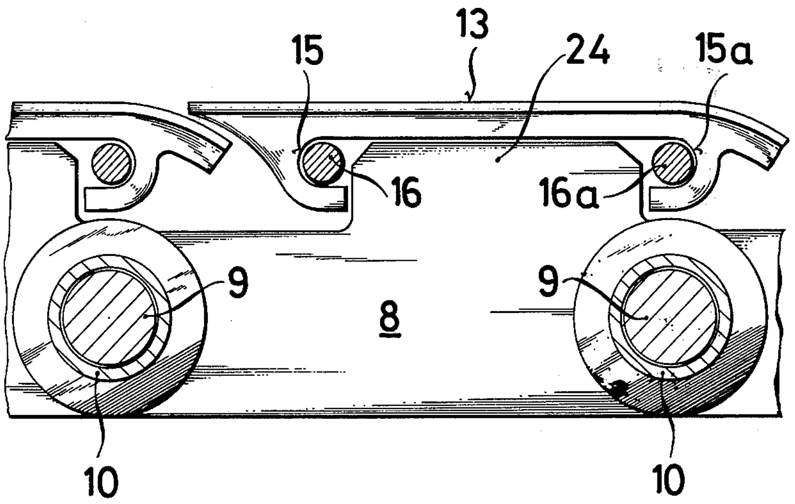
FIG. 4 is a fragmentary section along the line IV—IV of FIG. 2.

As is particularly apparent from FIGS. 2 to 4, in the region between two chain links 8 adjacent each other transversely of the chain 1 and in the region between two grate pins 9 adjacent each other in the longitudinal direction, support bodies 11 are disposed for receiving the material to be treated (on their upper sides in the upper run 1*a*), having between them grate slots 12 for the passage of the treatment gas.

In this travelling grate chain 1 according to the invention the support bodies 11 are each formed of bars 13 whose upper edge is higher than that of the chain links 8, as is particularly apparent from FIGS. 2 and 4, this reference to the different heights referring to the region of the upper run 1*a* of the chain 1.

The suppport bars 13 are made in a flat manner and are disposed on edge. Said support bars 13 extend in the longitudinal direction of the travelling grate chain 1, their one end being curved downwardly at the upper side and their other end curved downwardly at the lower side, so that in the longitudinal direction of the chain successive support bars can overlap adequately (in the region of their deflection points as well).

The upper edges 14 of the bars 13 which come into contact with the material to be treated have a slightly widened portion extending transversely of the chain so that the individual support bars (cf. FIGS. 2 and 5) are substantially T-shaped in section. The grate slots 12 formed between the individual support bars thus have their narrowest point in the region of these widened portions; this largely eliminates any clamping of parts of the material being treated.

Transverse recesses 15, 15*a* are formed in the support bars 13 at the lower side thereof and in the region of the two ends, said recesses having in the case of FIG. 4 the form of hooks which are open only in the longitudinal direction of the chain, preferably in opposite directions. The hooks 15, 15*a* of the support bar construction according to FIG. 4 are open towards the centre axis of the support bar 13; they could of course serve the same purpose by being open towards the ends.

The support bars are assembled with the transverse recesses, formed as hooks 15, 15*a* engaging rod-like holding members 16, 16*a* which lie substantially parallel to the grate pins 9. Each support bar 13 is thus supported on two rod-like holding members 16, 16*a*.

A support frame 17 is preferably provided for each support body 11 and includes at least two associated rod-like holding members 16, 16*a* which are fixedly connected together by struts 18 (cf. FIG. 3). One such strut 18 may be provided, or alternatively a plurality thereof distributed longitudinally of the holding members 16, 16*a*. In the embodiment according to FIGS. 2 and 3 each support body 11 extends substantially between the longitudinal centres of two chain links 8 which are adjacent each other transversely of the chain 1, separate support frames 17 being provided for each of said support bodies 11.

As shown in FIG. 2 the end support bars 13′,13″ disposed in the region of the longitudinal centres of the corresponding links 8 are welded on the ends of the associated rod-like holding members 16, 16*a*. It may therefore suffice to provide substantially in the region of the centre of the support frame 17 only a single connecting strut 18 to which the rod-like holding members 16, 16*a* (cf. FIG. 3) are welded. In the present case the support frame 17 has a pair of struts 18 screwed to a mounting plate 19, which is pushed loosely onto the corresponding spacer tubes 10 of the two grate pins 9 which are adjacent each other in the longitudinal direction of the chain, so that the support frame 17 and thus the holding members 16, 16*a* are supported on the corresponding spacer tubes 10.

Although in this case the support frame 17 is thus made by welding together the holding rods 16, 16*a* and the struts 8, such a support frame comprising rod-like holding members and the connecting struts may of course be made as a single casting; in that case, a plurality of connecting struts are preferably provided between the two rod-like holding members to give a grid-like support frame.

In the embodiment of the travelling grate chain 1 according to the invention illustrated in FIGS. 2 and 3, the holding rods 16, 16*a* of the support frame 17 are interrupted substantially in the region of the centre thereof to give an intermediate space 20 which is large enough for the individual support bars 13 to be inserted and if necessary removed therethrough, i.e. on assembly of the suppport body 11 the individual support bars 13 are placed edge on from above into the intermediate space 20 until the rods 16, 16*a* and the associated transverse recesses 15, 15*a* are in alignment with each other; then the individual support bars 13 are pushed to the left or right (cf. FIG. 2) onto the corresponding holding rods until the number sufficient for a complete support body 11 are present. To provide between every two adjacent support bars 13 the desired spacing for forming a grate slot 12 each support bar preferably comprises integrally formed lateral spacers 21 (only indicated in the left-hand side of FIG. 2). The desired grate slots 12 could of course also be achieved in a similar manner by mounting a corresponding spacer ring on the holding rod between each two adjacent support bars. Since the support bars 13′, 13″ provided at the ends of the holding rods 16, 16*a* are fixedly welded onto said rods it suffices for the support bars 13 fitted onto the holding rods in the centre holding region to be pushed on only loosely. To fix these support bars pushed on from the centre, when the support body 11 is substantially complete a support bar 13‴ is inserted into the aforementioned intermediate space 20 (in the centre region of the support frame 17) and has substantially the same cross-sectional form as the other suport bars 13 but does not comprise any transverse recesses for the holding rods 16, 16*a* and at its lower side in the region of the longitudinal centre comprises a downwardly extending lug 22 having a bore so that said support bar 13''' can be detachably fixed by means of a screw 23 to at least one connecting strut 18. Thus, by this centre support bar 13''' the loosely fitted support bars 13 of a support body 11 are simultaneously fixed; the support bars 13 can however be rapidly replaced when required after releasing and removing the centre support bar 13'''.

As already explained in conjunction with FIG. 1 the individual chain strands of the travelling grate chain 1 are supported by support rollers 7 in the region of the lower run 1*b*. To enable this to be done effectively in the embodiment previously described each chain link 8 is provided with an upwardly (with resepct to the upper run 1*a*) projecting web 24 (cf. FIG. 49 which in the longitudinal direction of the travelling grate chain 1 has a length such that it extends in the region between the holding rods 16, 16*a* of a support frame 17 up to the lower side of the support bars 13, so that the suport bars 13 disposed thereabove can bear on said web 24. In this manner a chain strand can be supported reliably by the support rollers 7 in the region of the lower run 1*b*.

The chain links 8 may be constructed in various forms. According to one embodiment they may be constructed in a flat manner and are then particularly simple to produce. However, it is advantageous in this case for the links 8 of a chain strand adjacent each other in the longitudinal direction of the chain to be formed alternately by a relatively thick individual link plate and by two spaced parallel adjacent relatively thin link plates, said spacing between the two thin link plates corresponding substantially to the thickness of the thicker link plate (c.f. especially the chain links 8 in FIG. 2). In this plate-like embodiment of the chain links both the thinner and the thicker link plates are of course preferably provided with a web (24) as described in conjunction with FIG. 4.

According to another alternative all the chain links 8 may be made identical, as known per se, a fork-like configuration being provided in each case at one end, the other end terminating straight and flat so that it can engage in the fork-like end of the link adjacent to it in the longitudinal direction of the chain.

Figure 5:
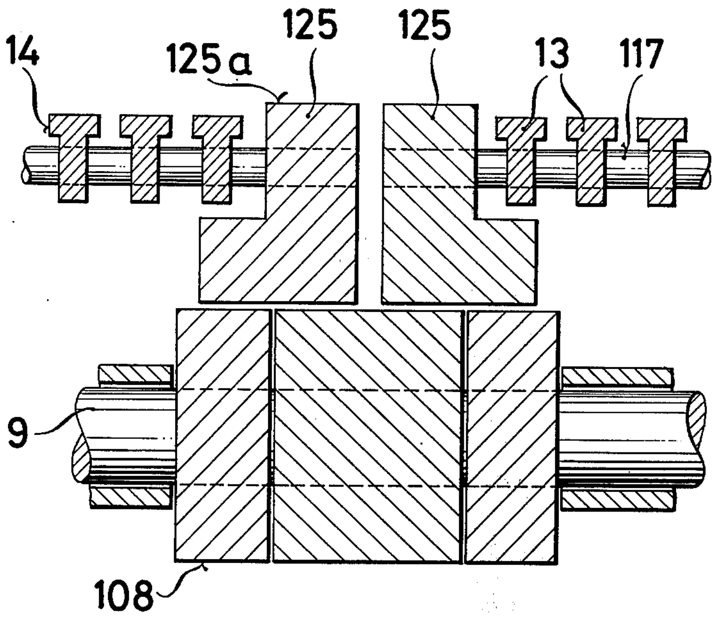
FIG. 5 is a fragmentary sectional view of a modification of the travelling grate chain according to the invention in which the connecting struts of two holding members for the support bars form at the same time support or running surfaces for the chain in the region of the lower run.

Whereas in the embodiment of FIGS. 2 to 4 a normal support bar 13', 13'' is fixedly welded to the ends of the holding rods 16, 16*a*, according to FIG. 5 at the ends of a support frame 117 or of the holding rods somewhat wider end plates 125 may be provided which preferably have the angled or L-shaped cross-section illustrated in FIG. 5 and bear at their lower sides directly on the associated chain links 8. Their upper edges 125*a* may lie at the same height as the upper edges of the support bars 13 or possibly somewhat higher. In either case the upper edges 125*a* of the end plates 125 serve as support surfaces for the support rollers 7 in the region of the lower run 1*b* of the chain 1; in this embodiment the chain links 8 need not then be made with the outwardly projecting web (24) explained in conjunction with FIG. 4.

Of course, numerous other embodiments and modifications are possible within the framework of the invention. For example, the transverse recesses in the support bars 13 (for receiving the rod-like holding members) may be made in the form of closed eyes. Furthermore, connecting webs of the holding rods may be detachably secured at the ends of the holding rods, via support angle members or the like, to the associated chain links by screwing or in any other manner.

Figure 6:
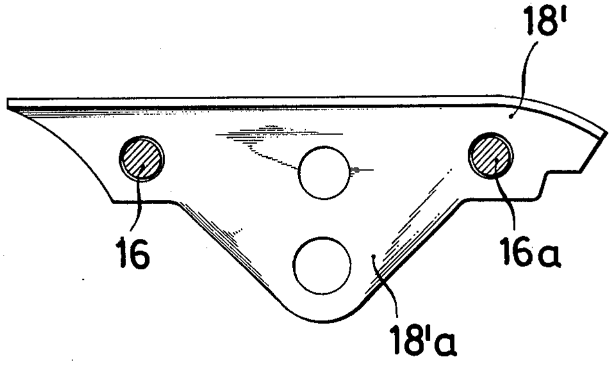
FIG. 6 is an elevation of a particular embodiment of a web connecting the rod-like holding members.
Figure 7:
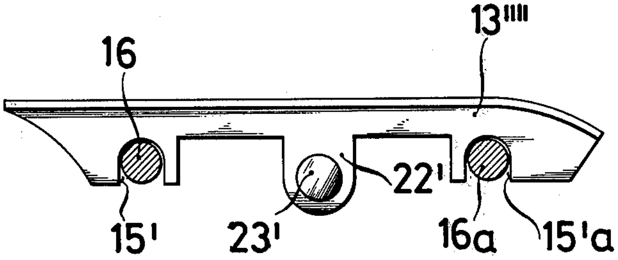
FIG. 7 is an elevation of a replacement support bar.

It is apparent from FIG. 6 that in each case two associated rod-like holding members 16, 16*a* may also be joined together by struts 18' which are arranged loosely on the rod-like holding members 16, 16*a* and are constructed in a manner substantially similar to a support bar 13 but having a downwardly extending projection 18'*a* with which they are screwed to a mounting plate 19 according to FIGS. 2 and 3, such mounting plate being supported on the corresponding spacer tubes 10 of two grate pins 9 adjacent each other longitudinally of the chain. In this connection it is further advantageous to provide replacement support bars 13'''' (cf. FIG. 7) which comprise downwardly open fork-like recesses 15', 15*a*' for engagement with the rod-like holding members 16, 16*a*. These replacement support bars 13'''' can then be secured when necessary by means of screws 23' inserted through projections 22', projecting downwardly in the centre region of the support bar, to the strut 18' or to a correspondingly adjacent other suppport bar 13 if the latter is constructed accordingly.

Figure 8:
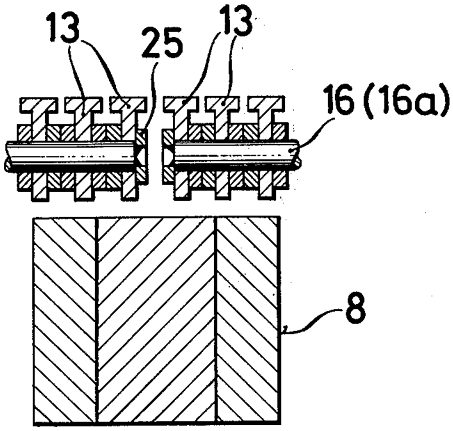
FIG. 8 is a fragmentary sectional view similar to that of FIG. 5, but showing terminal elements welded to the ends of the rod-like holding members.

It is further apparent from FIG. 8 that as end limitations for the rod-like holding members 16, 16*a* of the support bars 13, welded-on terminal members 25 may be provided. In the arrangement illustrated in FIG. 8, discs 25 are welded onto the ends of the rod-like holding members 16, 16*a*; in a similar manner, of course, a cross bracket could be welded to said ends so that in every case the support bars 13 are fixed on the rod-like holding members 16, 16*a*. The same purpose is also served by detachably secured, for example screwed, terminal members. The form of said terminal members may be chosen as desired provided that they do not impair the function of the support bars.

Finally, it is pointed out that with a travelling grate chain according to the invention the support body (with the support bars 13) may bridge one or more chain links in the transverse direction of the chain (cf. e.g. FIG. 2).

I claim:

1. A travelling grate chain comprising a plurality of parallel strands of chain links, such links being articulately connected together by grate pins that extend transversely over the entire width of the grate, wherein the improvement comprises rod-like holding members which are mounted on the chain and extend substantially parallel to the grate pins, and assemblies of individual support bars whose upper edges are higher than the chain links, each support bar having two recesses to receive two rod-like holding members, and each assembly of support bars extending substantially between the longitudinal centers of two chain links, being supported by a separate pair of rod-like holding members, for receiving material deposited on the travelling grate chain, and comprising slots for the passage of treatment gas, each pair of rod-like holding members being interrupted at an intermediate point to provide a gap for insertion and removal of the support bars.

2. A travelling grate chain according to claim 1 wherein each support bar comprises at least one integrally formed laterally extending spacer, for maintaining a grate slot between such support bar and an adjacent support bar.

3. A travelling grate chain according to claim 1 wherein the recesses in the support bars are in the form of apertures.

4. A travelling grate chain according to claim 1 wherein transverse recesses are provided on the lower side of each support bar.

5. A travelling grate chain according to claim 4 wherein the transverse recesses are in the form of hooks which are open longitudinally of the chain.

6. A travelling grate chain according to claim 1 wherein the support bars are substantially flat and are arranged perpendicular to the rod-like holding members.

7. A travelling grate chain according to claim 6 wherein each support bar, at the edge which comes into contact with the material to be treated, is slightly widened transversely of the chain.

8. A travelling grate chain according to claim 1 wherein spacer tubes are disposed on the grate pins between chain links, and the rod-like holding members are fixed together in pairs by struts which connect the two members of each pair and are supported through at least one mounting plate on the spacer tubes of two adjacent grate pins.

9. A travelling grate chain according to claim 1 wherein a support bar is fixed upon each lateral end of each pair of rod-like holding members, support bars are fitted loosely on the holding members, and in the gap of each pair of holding members is located a support bar which is detachably secured to a strut which connects the pair of holding members.

10. A travelling grate chain according to claim 1 wherein the chain-links are plate-like.

11. A travelling grate chain according to claim 1 wherein two struts which connect a pair of rod-like holding members are fixed on the lateral ends of such members.

12. A travelling grate chain according to claim 1 wherein spacer tubes are disposed on the grate pins between chain links, and struts in each of which are loosely mounted two rod-like holding members are constructed similarly to the support bars but have a downward projection screwed to a mounting plate supported by the spacer tubes of two adjacent grate pins.

13. A travelling grate chain according to claim 12 wherein a replacement support bar has two downwardly open fork-like recesses engaging two rod-like holding members and is secured by a screw to an adjacent support bar.

14. A travelling grate chain according to claim 1 wherein retainers for the support bars are secured to the lateral ends of the rod-like holding members.

* * * * *